United States Patent [19]
Stoll

[11] Patent Number: 6,029,598
[45] Date of Patent: Feb. 29, 2000

[54] TRAILERABLE HOUSEBOAT/CAMPER WITH REMOVABLE PONTOONS

[76] Inventor: Richard A. Stoll, 2404 Arrowhead Dr., Summerfield, Kans. 66541

[21] Appl. No.: 09/013,430

[22] Filed: Jan. 26, 1998

[51] Int. Cl.[7] .................................................. B63C 13/00
[52] U.S. Cl. ......................................... 114/344; 114/61.16
[58] Field of Search ................................ 114/344, 61.15, 114/61.16, 61.19

[56] References Cited

U.S. PATENT DOCUMENTS 3,172,134  3/1965  Livingstone ............................ 114/344
3,541,987  11/1970  Barkley ................................. 114/61.16

Primary Examiner—Sherman Basinger
Attorney, Agent, or Firm—Bruce J. Clark

[57] ABSTRACT

A combination houseboat/camper that is trailerable, and that has pontoons that are both easily removable and/or capable of being stored during travel on top. A removable motor and cable, in combination with the removable rotational pin about which the pontoons rotate, allow the pontoons to be moved to four different positions, including easy removal of the pontoons in low ceiling garages.

3 Claims, 5 Drawing Sheets

TRAILERABLE HOUSEBOAT/CAMPER WITH REMOVABLE PONTOONS

BACKGROUND OF INVENTION

The present invention is directed to a trailerable combination houseboat/camper units with pontoons.

Houseboats sufficiently narrow so as to need special road permits for trailering (less than 8' 6" wide) are often unstable and more prone to capsizing in water. Adding pontoons makes them too wide for travel on highways during transportation. For a camper to be highway transportable, the pontoons have to be easily removable and storable or moved on top or elsewhere within the apparatus. Moreover, some storage buildings, or entrances to the same, have low ceilings that do not allow for storage of houseboats with pontoons stored on top.

It is therefore an object of the invention to provide a trailerable houseboat having pontoons that are both easily storable atop the unit during travel utilizing simple pivotal attachments to the houseboat and simple cable means, yet having easily removable pontoons, for example when utilizing the houseboat as a camper on the trailer over ground when no pontoons are needed, or for garaging the houseboat in low-ceiling garages. It is a further object of the invention to achieve these objectives utilizing the structure, lift means and attachment means that are neither unattractive nor obtrusive in the interior cabin.

It is a further object of the invention to allow such an invention to work with most common trailers.

It is a further object of the invention to provide a houseboat with pontoons wherein said houseboat has its own main hull providing at least 30% of the buoyancy in addition to the buoyancy provided by the pontoons.

It is also an object of the invention to provide such a houseboat with easily removable pontoons wherein the houseboat is as light as possible, and without concern as to the water readiness of all mechanical and inner workings normally used during travel such as wheel bearings, brakes, clearance lights, tail lights, cable lift means, etc. Inasmuch as the instant invention is trailerable, such items are not significantly exposed to the water during use such as is a common problem with amphibious vehicles.

It is a further object to provide a pontoon lift system that not only provides for easily removable pontoons, but does so with a minimum of moving parts and that is quicker and simpler to operate.

Other objects and features of the invention and the manner in which the invention achieves its purpose will be appreciated from the foregoing and the following description and the accompanying drawings which exemplify the invention, it being understood that changes may be made in the specific method and apparatus disclosed herein without departing from the essentials of the invention set forth in the appended claims.

DESCRIPTION OF THE PREFERRED EMBODIMENT

Figure 1:
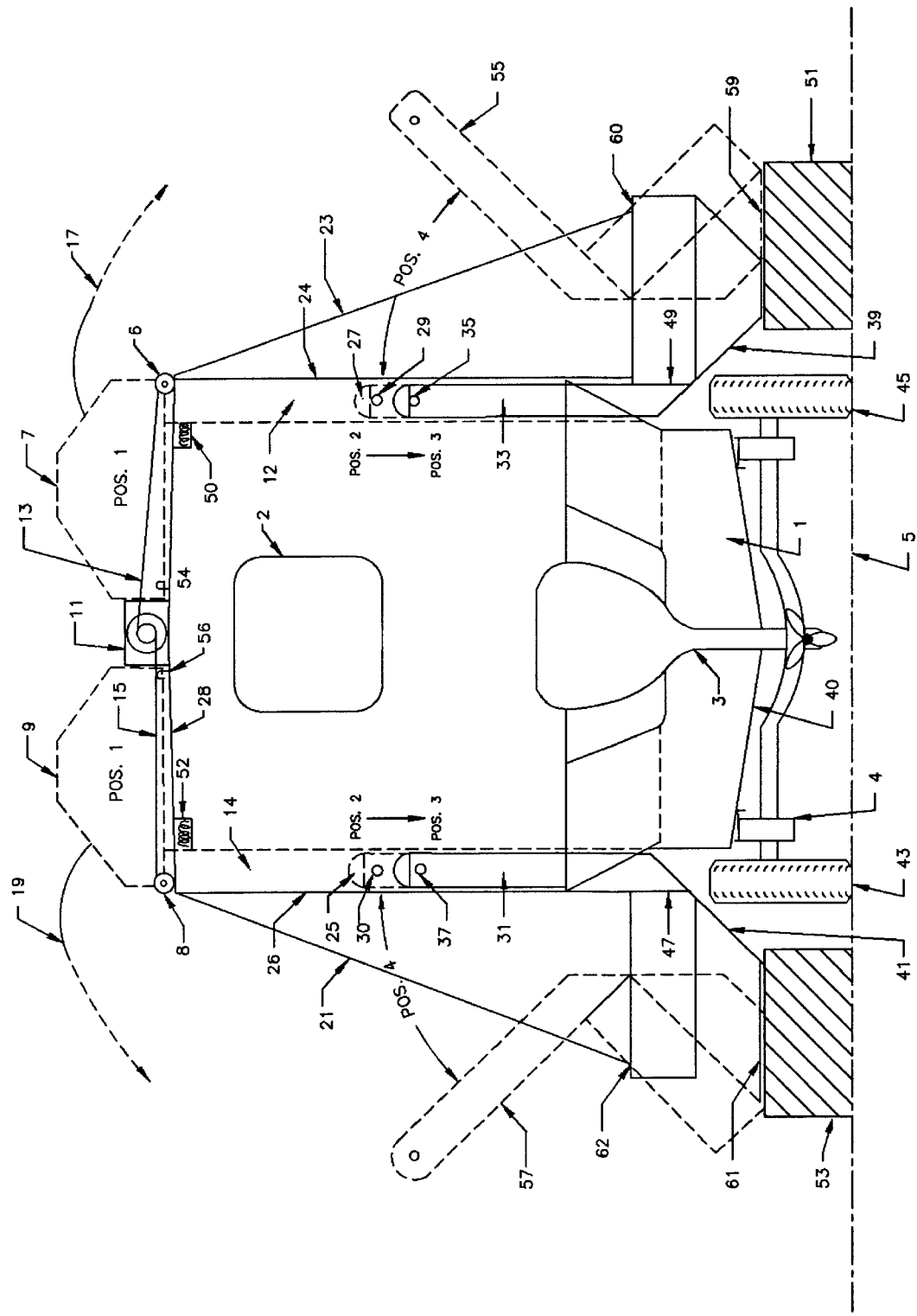
FIG. 1 is an end view of the invention showing the cable lift system and the four positions that the lift system allows.

The preferred embodiment is shown from an end view in FIG. 1 reflecting the various positions 1 through 4 that the apparatus allows for the pontoons. The invention 1 is shown from an end view with motor 3, all resting on trailer 4. The trailer is intended to be a typical highway-ready trailer for transporting the boat to and from the lake or desired body of water. Should the unit be used as a camper on ground, the unit can simply remain on the trailer.

In FIG. 1 it can be seen that the pontoons 7 and 9 are shown in their stored position 1 atop the camper. The camper is, comprised of generally enclosure means having two sides 24 and 26, and a top 28. The window 2 is shown in the end wall of the camper. Hull means 40 is attached underneath the camper. In the preferred mode, the hull provides some of the buoyancy for support which allows the pontoons to be smaller, and to be easily lifted using the simplified means described hereafter. In part so that the pontoons may be sufficiently small and light to enable them to be lifted utilizing the simple motor means shown, the hull should be able to provide at least 30% of the buoyancy of the entire invention.

Directional lines 17 and 19 reflect the general movement of the pontoons when lowering them into position for flotation. This is accomplished by utilizing rotational motor means 11 connected to an appropriate power supply (preferably a 12 volt power supply available on site). The motor is reversed as the pontoons are given an initial thrust by the operator to get them started. It will be seen that the spring loaded mechanism means 50 and 52 automatically provide some lateral force means into the channels 12 and 14 respectively to assist in forcing the arm and pontoons outwards once the lock means 54 and 56 are released allowing the free rotational movement of the pontoons as the cable 13 and 15 unwinds. The rotational movement occurs about pivot points 29 and 30. These are simple pin means through the arms 27 and 25 which pin is removably secured in the camper sides 24 and 26. In the preferred mode, the cables 13 and 15 are actually one continuous cable ("cable" includes ropes, chains, or other elongated flexible means for pulling), reversibly wrapped around a single spool 158 attached to a motor 11, to provide winch type means, such that the motor, when turning, allows both pontoons to be raised and/or lowered simultaneously. However, multiple motors are envisioned. In practice, any means for turning the spool are envisioned, including manual turning.

The pontoons are lowered 180° such that the arms 27 and 25 proceed to position 2. (The pontoons themselves are not shown in position 2 in this figure for purposes of clarity, but are shown in position 2 in FIG. 3). Position 2 is the normal operating and floating position.

However, when the pontoons are not needed, such as during garaging with low ceilings, or during ground use of the camper while on the trailer, the pontoons can be readily removed by taking out the pins at 29 and 30, and lowering the cables 13 and 15 still further. Because of the top-loading arrangement and the use of cables attached to the outer sides of the pontoons, this downward vertical movement from position 2 to position 3, once the pin is removed at 29, is easily accomplished without tipping the pontoons. Blocks 51 and 53 are used so that the pontoons can come to rest on those without first hitting the tires 43 and 45. Finally, the cables are removed at 60 and 62 allowing the pontoons to tip gently sideways on their sides 59 and 61. Consequently it will be seen that removing the pontoons is as simple as taking out the pin, flipping the switch to continue the motor unwinding a few more inches, then unhooking the cable at 60. Pins 29 and 30 are easily removable using a cotter pin arrangement.

Figure 2:
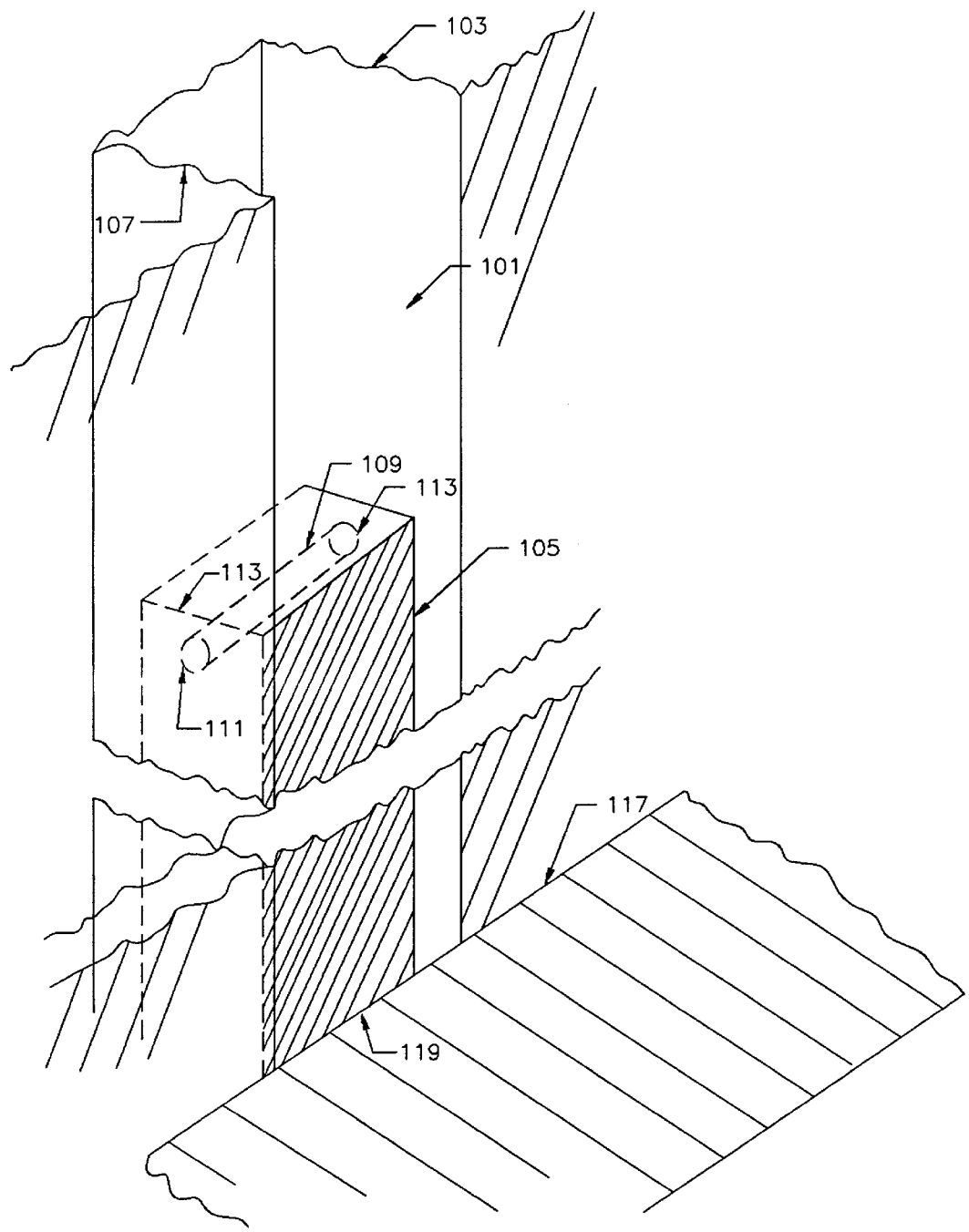
FIG. 2 shows the channel, the pontoon and arm in the channel.

The arm and pontoon arrangement is seen in more detail in FIG. 2. The arm 105 is shown in the channel 101 which channel is recessed in the respective sides of the camper. The arm 105 is attached to the sidewalls 103 and 107 utilizing pin 109 protruding through the arm 105 at 111 and 113. There the pin extends into holes in the sidewalls 103 and 107 and secured with cotter pins. In practice, any pin arrangement or other mechanical means for providing the pivotal movement of the end 113 of arm 105 about the pivot point 111 is envisioned. The arm 105 is affixed in the preferred mode to the pontoon 117 in the preferred mode at 119 although means for removing the pontoon from the arm are also envisioned, such as a nut and bolt assembly. The arm can be made of any rigid means or structure. The channel 101 extends from the top of the camper down vertically through the side.

Figure 3:
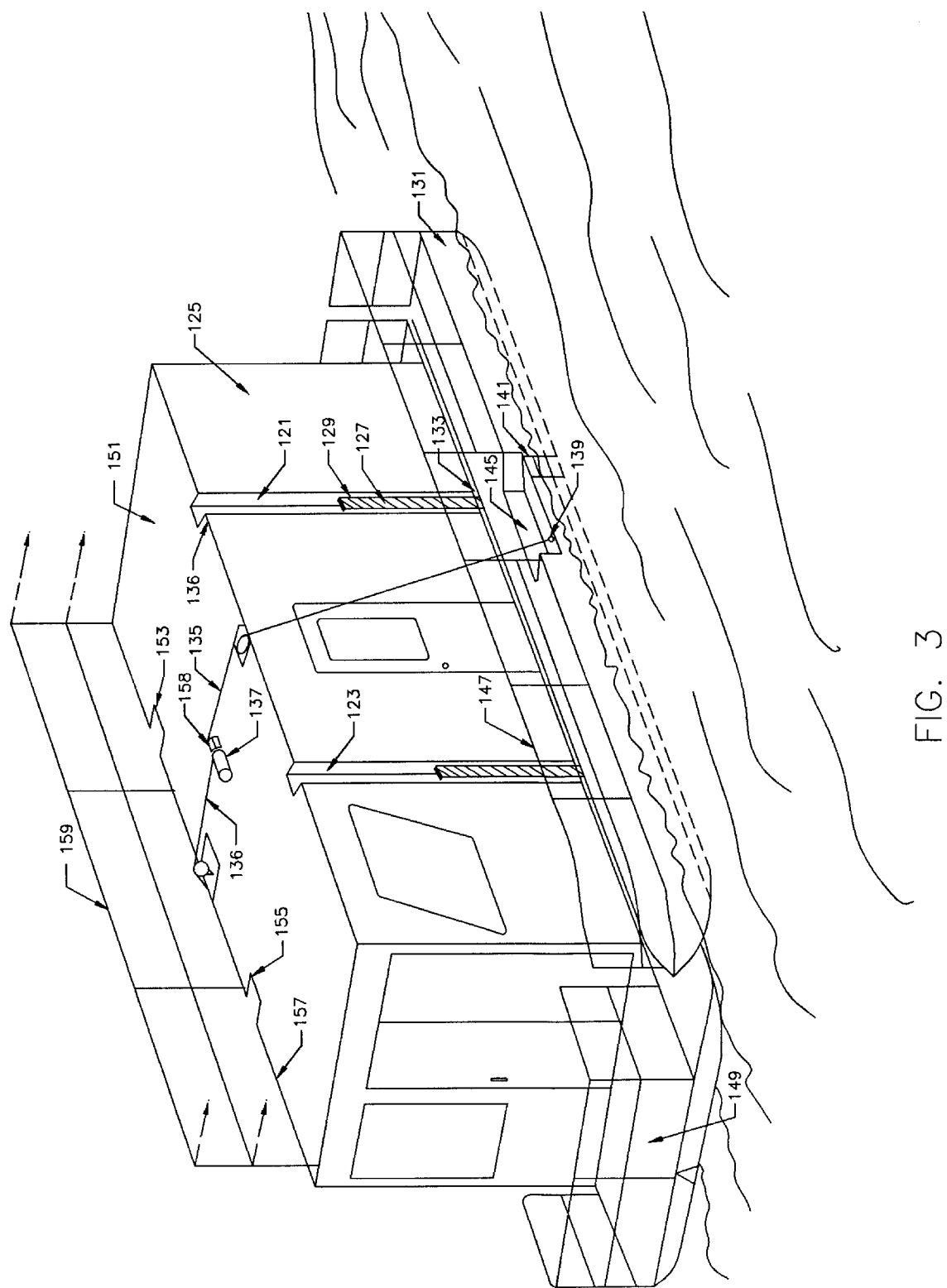
FIG. 3 shows the perspective view of the houseboat on the water with pontoons in place, and with the cables still attached (the cables are normally removed at this point).

These channel arrangements can be seen in general in FIG. 3 on one side. The channels 121 and 123 are shown in the side 125. Arm 127 is rotatably connected at 129 at one end of the arm and the opposing end is affixed to the pontoon 131 at 133.

Also shown in FIG. 3 is the cable means 135 wrapped around the motor 137 attached to the pontoon 131 at 139 using a spring-loaded hook latching means, or other removable latching means. Ladder 141. is hingedly attached to the pontoon 131 for access to the water. By hinging the same, it can fold back into the recess 145 during transportation. All rails, such as 147, on the lower deck and pontoons hingedly attached to the pontoons so as to fold down and store under them on top of the camper during travel. In the alternative, the railings can also be removed by inserting the vertical posts into post-receiving holes in the pontoon 131 or in the deck 149 respectively.

On the top 151 of the houseboat will be seen opposing channels 153 and 155 on side 157 opposing side 156. Top railings 159 are hingedly attached in the preferred mode at the bottoms of the vertical poles where they meet the sides at 157 or elsewhere around the top perimeter so as to fold down during transport flat against the top. Arrows mark the continuation of the railings around the perimeter. Other railings are omitted in the drawing to maintain clarity of the drawing.

The cable 135 and wound motor/winch 136, while shown in FIG. 3, is normally removed once the pontoons are in place and the boat is in the water so as not to interfere with the normal enjoyment. This adds another feature and advantage of the invention in that the cable is easily removable and storable. It will also be seen that the arrangement and coordination of the arms, the simplicity of the movement, and the simplicity of the cable lift means, allow full use of the interior of the cabin and do not interfere with the same.

Figure 4:
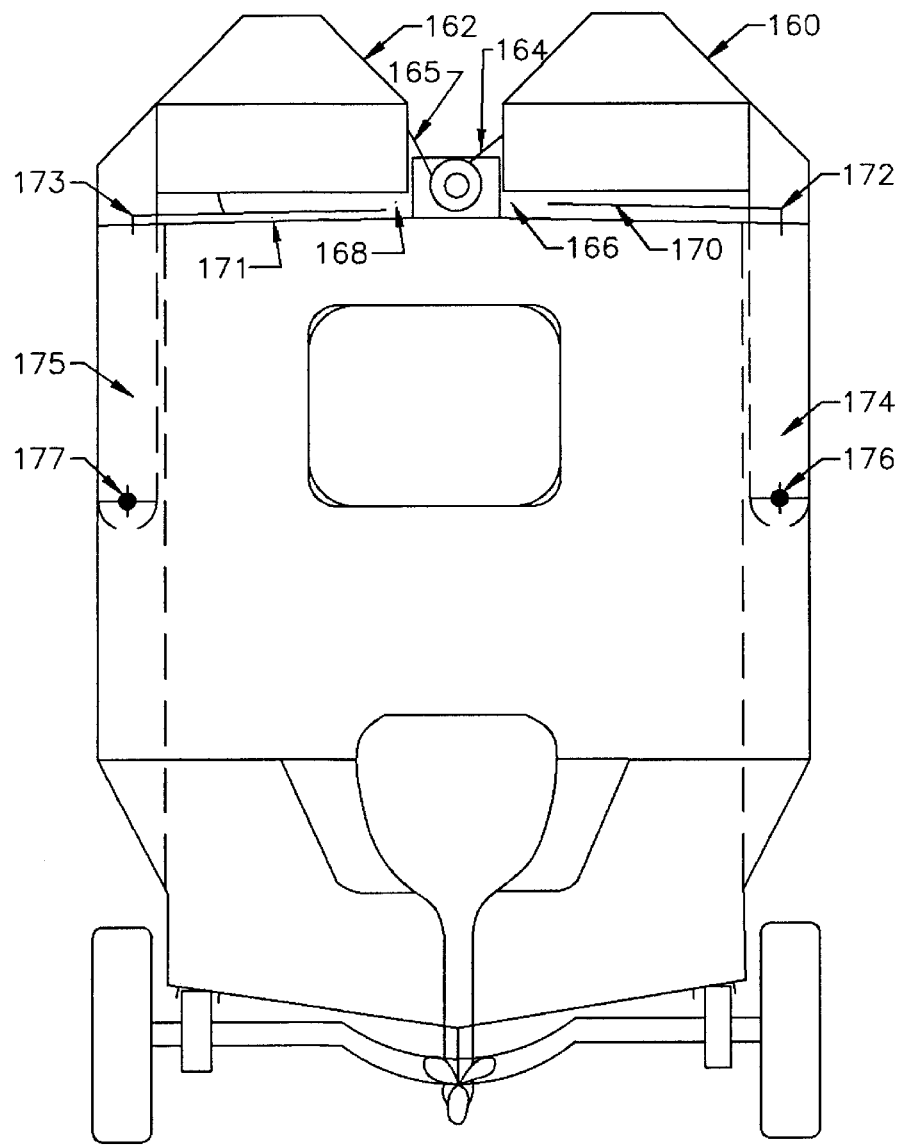
FIG. 4 is an end view of the invention with the pontoons in place on top.
Figure 5:
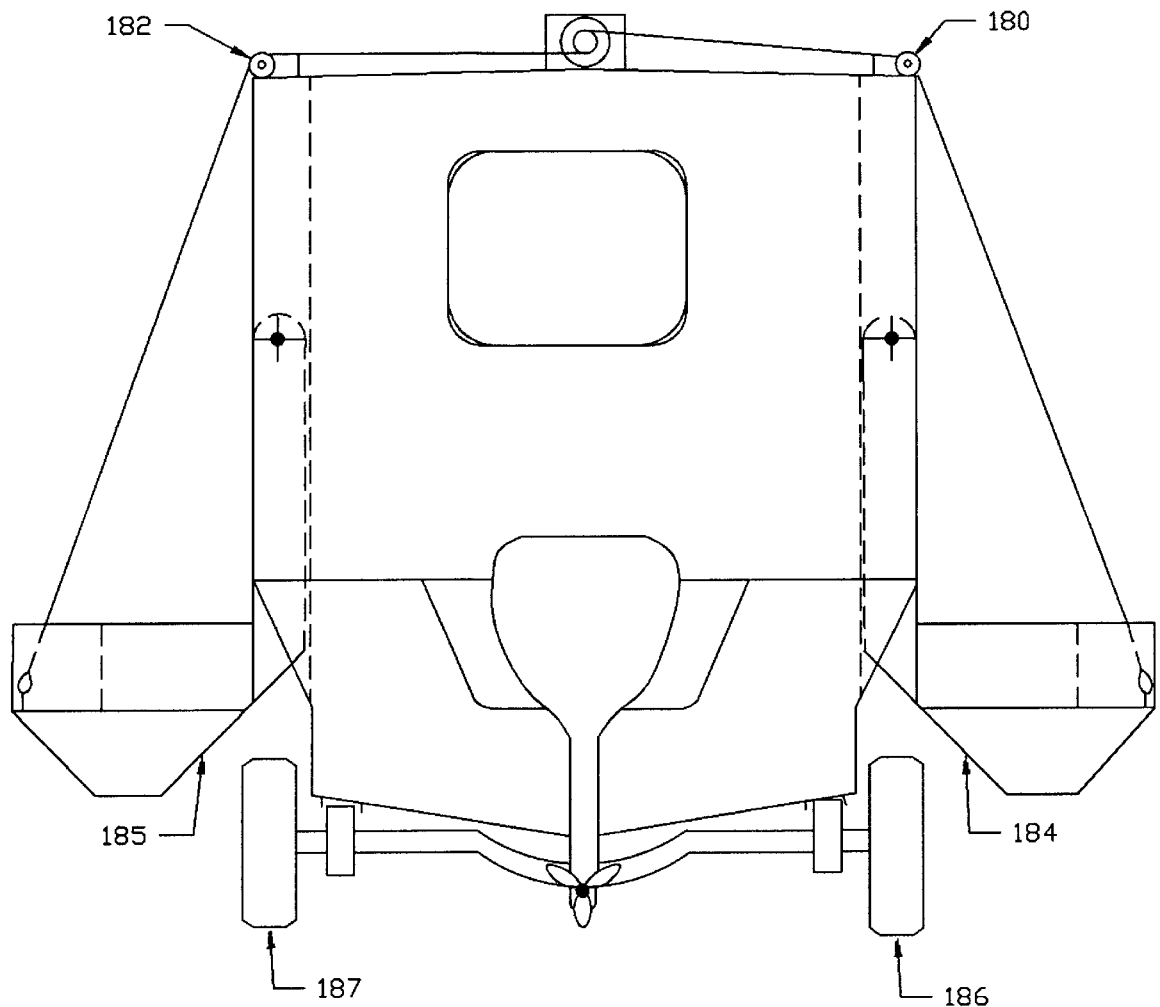
FIG. 5 is an end view of the invention with the pontoons in place for flotation while the houseboat is still on the trailer.

In FIG. 4, the pontoons can be seen in the transport mode atop the unit. Pontoons 160 and 162 are held tight via cables 164 and 165. Cushion means are envisioned just beneath the pontoons at 166 and 168. This could be an inner tube in the simplest sense although the padding means to avoid the pontoons bumping up and down is envisioned. Also seen in FIG. 4 are the top railings 170 and 171, hinging at 172 and 173 respectively. If pontoon railings are hingedly attached, they would also fold in at this location. The arms 174 and 175 are shown now vertically upward, still rotating about pivot points 176 and 177, corresponding to pivot points 29 and 30 in FIG. 1.

FIG. 3 shows the pontoons in their downloaded position ready for the camper to be placed in the water. Pulley arrangements 180 and 182 are seen to facilitate the directional movement of the cable. These pulleys are located at the top side corners of the camper. It will be seen that the pontoons are designed with angles 184 and 185 so as to provide not only ease of movement in the water, but to allow the camper to be placed on a typical trailer and avoid interference with the wheels 186 and 187.

As indicated earlier, in use, one simply provides the power to the motor, commencing the rotational movement, pulling the cables up or letting them down, as desired and then pulling out the pins and releasing the cable still further to allow the pontoons to be moved vertically down and removed.

Consequently it will be seen that a versatile, lightweight, simple to make, simple to use and operate, combination houseboat/camper is disclosed, that is ready for highway transportation and that further allows for easy removal of the pontoons, and that more particularly and importantly allows for unfettered used of the cabin without interference from the mechanisms in the prior art.

While there have been shown and described particular embodiments of the invention, it will be obvious to those skilled in the art that changes and modifications may be made without departing from the invention or its equivalent, and, therefore, it is intended by the appended claims to cover all such changes and modifications as fall within the true spirit and scope of the invention.

I claim:

1. A trailerable combination houseboat/camper with readily removable pontoons comprised of:

a houseboat with cabin means having two sides and a top, each side having at least two vertical channels;

main hull means attached underneath the cabin opposite the top for providing buoyancy support in water;

a pair of elongated pontoons having elongated rigid arms attached thereto, said arms having one end rotatably attached about a pivot point at the side, hingedly attached to the respective sides each of said pontoons having an inner edge near the side and an outer edge opposite;

at least one cable, having at least two ends, and rotational motor means on top for winding and unwinding the cable and responsive to the rotational movement of the motor;

means for removably attaching at least one end of the cable near the outer edge of the pontoons so as to allow the cable to move the pontoons to three positions, with the arms within the vertical channels, the first position on top, the pivot end approximately 180° about the hinged pin means to a second position adjacent the main hull, and, when the pin means are removed, vertically downward to a third position such that the arms stay within the vertical channel.

2. The trailerable houseboat/camper in claim 1 having railings hingedly attached to the top near the sides.

3. The trailerable houseboat/camper in claim 1 wherein the pontoons have a recessed portion therein for allowing easier access to the water, and wherein said pontoons have railings hingedly attached thereto.

* * * * *